United States Patent

[11] 3,561,797

| [72] | Inventor | Karl-Heinz Wagner<br>Mannheim, Germany |
|---|---|---|
| [21] | Appl. No. | 814,255 |
| [22] | Filed | Apr. 8, 1969 |
| [45] | Patented | Feb. 9, 1971 |
| [73] | Assignee | Aktiengesellschaft Brown, Boveri & Cie.<br>Baden, Switzerland<br>a joint stock company |
| [32] | Priority | Apr. 18, 1968 |
| [33] | | Germany |
| [31] | | 1,750,285 |

[54] COUPLING FOR GAS-TIGHT CONNECTION OF TWO TUBULAR CASING SECTIONS OF A PRESSURE GAS INSULATED SWITCH PLANT
7 Claims, 8 Drawing Figs.

[52] U.S. Cl. .................................................. 285/368,
174/84; 285/349
[51] Int. Cl. .................................................. F16l 17/00
[50] Field of Search ......................................... 285/325,
363, 368, 369, 370, 371, 372, 373, 405, 412, 417,
418, 419, 349; 200/168G; 174/84, 17.11

[56] References Cited
UNITED STATES PATENTS
| 773,046 | 10/1904 | Bayles ........................ | 285/363X |
| 2,857,142 | 10/1958 | Gertzon ....................... | 285/363X |
| 3,249,378 | 5/1966 | Sees et al. ..................... | 285/405X |

FOREIGN PATENTS
| 1,048,449 | 1/1959 | Germany ..................... | 285/368 |

*Primary Examiner*—Dave W. Arola
*Attorney*—Pierce, Scheffler & Parker

ABSTRACT: In a coupling for the gastight connection of two coaxial tubular casing sections of a pressure gas insulated switch plant which enclose electrical components the sections are provided with outwardly directed end flanges, are spaced apart axially, and the spacing between the end flanges is bridged over by two tubular coupling parts which have outwardly directed, bolted together flanges meeting in a sealed joint and inwardly directed flanges in alignment with the end flanges on the tubular casing sections so as to form circular joints between the confronting end faces of the outwardly and inwardly directed flanges. The inwardly directed flanges on the coupling parts are secured to the outwardly directed flanges on the tubular casing sections by means of a series of bolts and a flange ring and which also provides a seal structure for the circular joint.

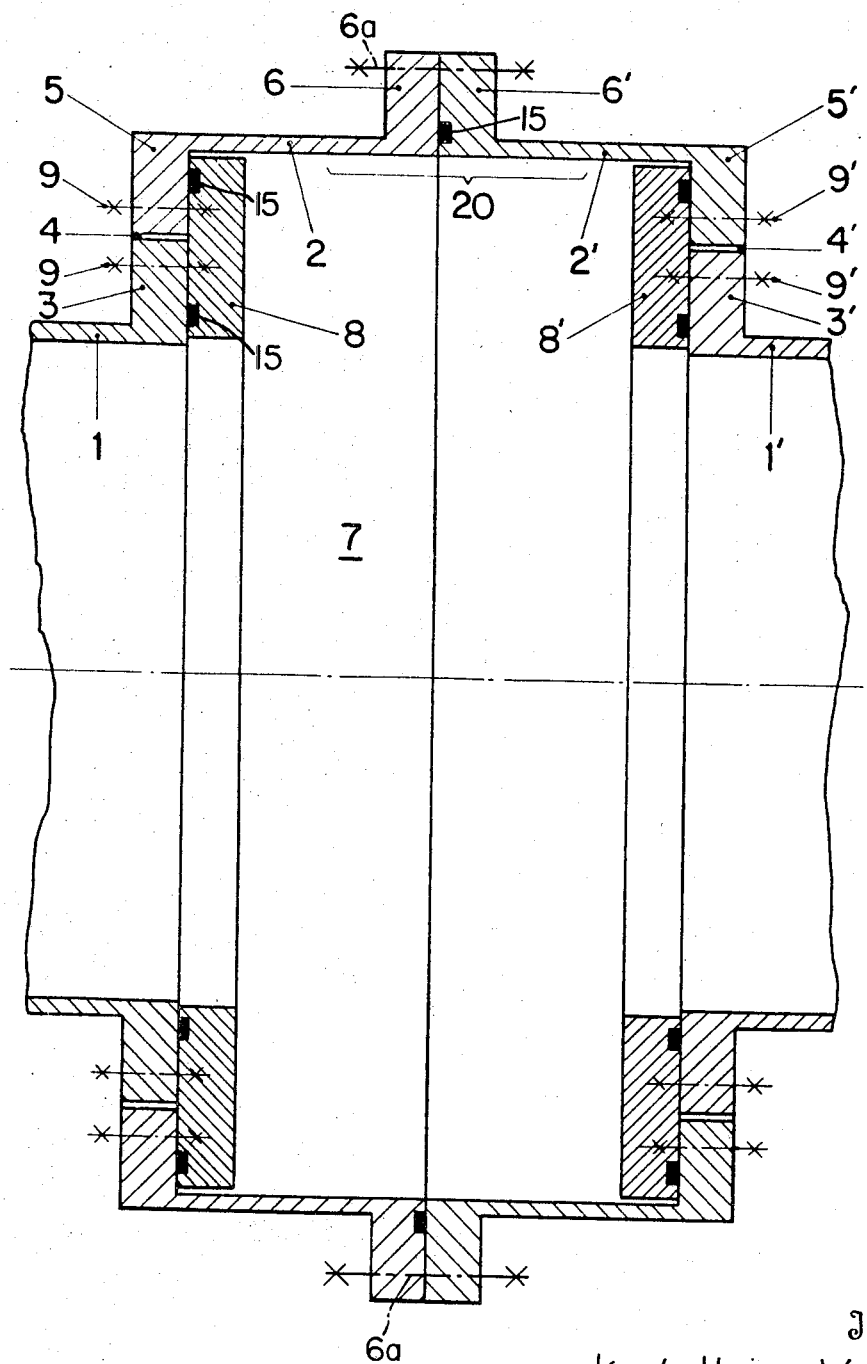

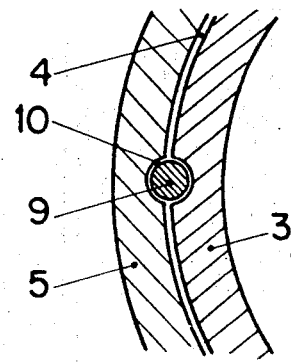
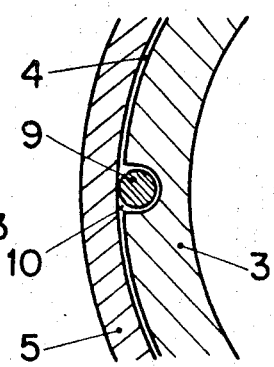
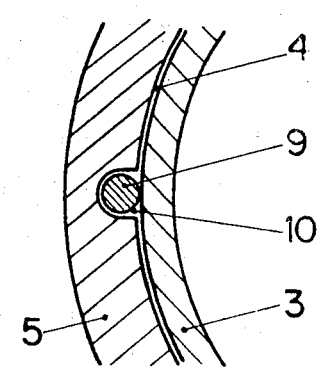
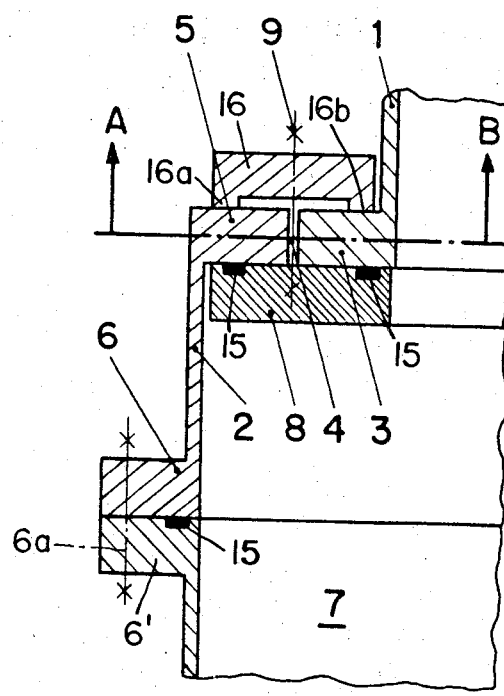
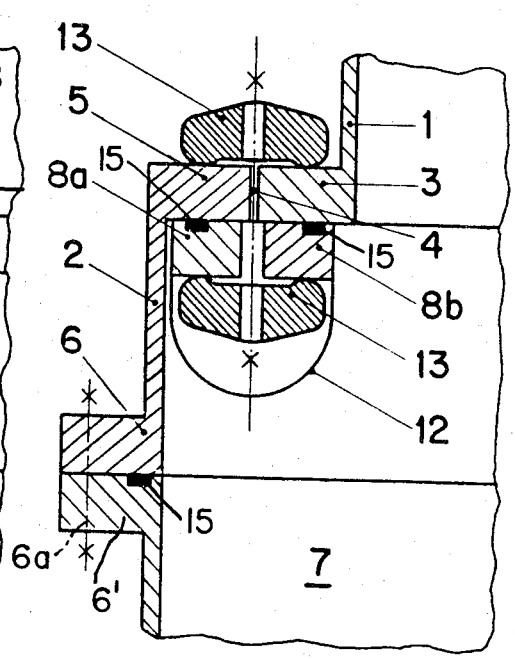
Inventor
Karl-Heinz Wagner

COUPLING FOR GAS-TIGHT CONNECTION OF TWO TUBULAR CASING SECTIONS OF A PRESSURE GAS INSULATED SWITCH PLANT

The present invention relates to pressure-gas-insulated electrical switch plants and more particularly to an improved arrangement for coupling two tubular casing sections of the switch plant in a gastight manner.

A special problem in the construction of pressure gas-insulated switch plants with tubular casing sections is the assembly and disassembly of parts of the plant and the inspection of contact pieces, for example, in indoor isolating switches, bus bars, circuit breakers, etc. The difficulties are particularly great when individual pieces must be removed from a long tubular bus bar or when an L- or T- shaped indoor isolating switch must be disassembled. Since displacement of the remaining parts of the plant is not possible, the parts must be removable transverse to their longitudinal axis.

Pressure-gas insulated switch plants provided with casings are already known, where two spaced casing sections are connected with each other for this reason by means of a tubular coupling part which can be pushed over the casing wall. The coupling part strikes with its inner surface against outwardly directed flange edges of the casing sections, forming joints extending parallel to the casing wall. Flange rings which can be displaced on the wall of the casing sections are used to connect the coupling part with the casing section, as disclosed in German Patent DAS 1,230,115.

In this embodiment, the flange rings arranged on the casing wall must be attached before the flange is applied; they can thus not be attached on casing sections which have already been provided with flanges. In addition, the casing sections must be so designed at the coupling point that the coupling piece can be pushed completely over the casing section. This is particularly difficult in T- or L-pieces, because the free length of the section is not sufficient there in most cases to be able to push the coupling piece completely over the casing wall.

The subject matter forming the present invention is the further development of these couplings in an advantageous manner. It is to be avoided that the flange rings establishing the connection have to be pushed over the casing ends before the flange is applied. In addition, the free length of the end of the casing section, which is necessary for the attachment of the coupling part, should be kept as small as possible so that sections branches in the form of L- or T-pieces, for example, can be arranged in the immediate proximity of the coupling point.

The present invention is thus a coupling for achieving a gastight connection between two axially spaced tubular casing sections of gas pressure-insulated switch plants with a removable tubular casing part which, when removed, permits access to the interior of the casing section. The invention is characterized by the fact that the removable tubular casing part is itself constituted by two tubular portions provided with juxtaposed outwardly extending flanges on one end bolted together in a sealed joint and inwardly extending flanges on the other end which confront correspondingly located outwardly extending flanges on the ends of the spaced apart casing sections thereby to establish circular joints extending parallel with the axis of the casing sections. The inwardly and outwardly extending flanges are secured to each other by means of a series of bolts and a flange ring and which also provides a seal for the circular joints.

In a further development of the idea of the invention, additional great advantages are achieved by a simple gas seal on the coupling joint, by the possibility of equalizing the length of the casing sections at the coupling point, and by a special bolted joint to maintain the sealing pressure on both sides of the coupling joints.

The idea of the invention will be described more fully on the basis of embodiments represented in the accompanying drawings, and the additional advantages that can be achieved will be shown.

FIG. 1 shows a basic embodiment of the coupling according to the invention in a section.

FIG. 2 shows a simple design of the connecting point at the coupling joint, likewise in a section.

FIGS. 2a, 2b, 2c show each in a lateral elevation along the line A–B in FIG. 2 various possible arrangements of the bolted joint.

FIG. 3 shows a connection at the coupling joint which likewise permits longitudinal equalization.

Figure 4A:
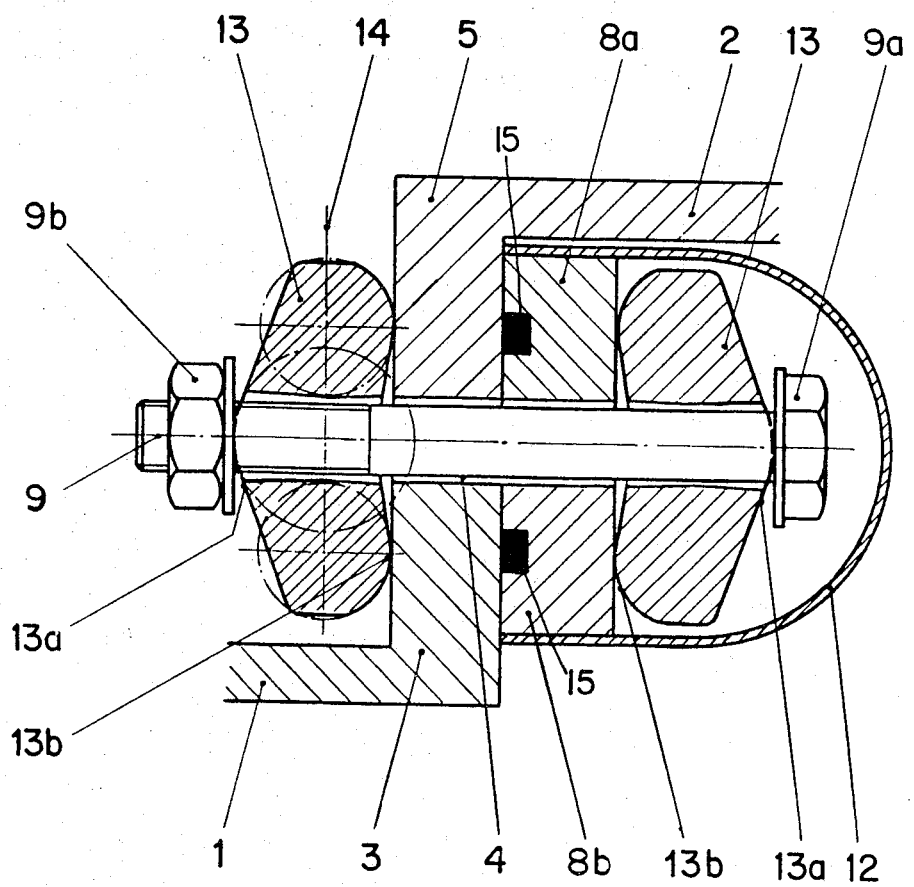
FIG. 4a shows another embodiment of the connection according to FIG. 3.

As it can be seen from FIG. 1, the axially spaced casing sections 1 and 1' are connected, for example, by a pressure gas-insulated bus bar through the tubular coupling part 20. The casing sections bear here with outwardly directed end flanges 3, 3' against inwardly directed end flanges 5, 5' of the coupling part 20, forming circular joints 4, 4' extending parallel to the juxtaposed end faces of the flanges 3, 5 and 3', 5'. According to the invention, the coupling part 20 consists of two tubular parts 2 and 2', which are joined transverse to the longitudinal axis over outwardly directed flanges 6, 6' connected together by a series of circumferentially spaced bolts 6a and the coupling joints 4, 4' are bridged over by flange rings 8, 8' arranged in the interior 7 of the casing, which also carry the connecting bolts 9, 9'.

If the coupling part 1 is to be disassembled, for example, by removing it transverse to the longitudinal axis, the bolts 9, 9' as well as the bolts 6a connecting the flanges 6, 6' of the two coupling parts 2, 2' must be unfastened. The two coupling parts 2, 2' can then be pushed to the left and right over the casing sections 1 and 1'. The interior of the casing is accessible, so that the current connection (not represented) can be loosened. Then the casing part 1 can be removed transverse to the longitudinal axis.

The new coupling has two essential advantages. First, the required free length of the casing sections 1 and 1' respectively over which the coupling part 2 and 2' respectively is to be pushed, is small, which is achieved by subdividing the coupling part. In the immediate proximity of the flanges 3, 3' can thus be arranged casing branches or a casing widening. The direct coupling of T- or L-parts is thus possible.

Second, the coupling is readily applicable in standard, that is, not specially prepared casing sections. Due to the arrangement of the flange rings 8, 8' in the interior of the casing, these can be inserted or removed at any time at the coupling point. Their assembly is completely independent of the flanges 3, 3' arranged on the sections 1, 1'.

It should be kept in mind that the coupling will only be used in those cases where a transverse assembly of the casing sections is desired. Otherwise the casing sections 1, 1' would be joined directly with their flanges 3, 3' by bolts. In the manufacture of the casing sections it is thus not necessary to distinguish for what type of assembly the section ends must be suitable.

A simple connection of casing parts with the tubular coupling can be achieved - as shown in FIG. 2 - if, in a further development of the idea of the invention - the flange rings 8 each carry only one row of fastening bolts 9 which extend from flange ring 8 through the joint 4 to and through a clamping ring 16 bridging the joint and having end flanges 16a, 16b bearing respectively against flanges 5 and 3. According to a variant shown in FIGS. 2a, 2b, 2c, the inwardly directed flanges 5 of the coupling parts 2 and/or the outwardly directed flanges 3 of the casing sections 1 have open bores or half bores 10 at the joint 4 for receiving the fastening bolts 9. In this way one obtains a particularly simple connection and sealing at the flange joints.

Another advantageous possibility results from a further development of the idea of the invention according to the embodiment in FIG. 3. Here the possibility is provided of ensuring with the new coupling at the same time a longitudinal equalization between the various casing sections. To this end, at least one flange ring is subdivided into two ring parts 8a and 8b, and both ring parts are connected over a ring-shaped elastic sheath 12 which encloses hermetically the connecting bolts 9 toward the casing interior 7. The clamp connection to be established at the joint 4 by means of the bolts is effected over two crowned pressure rings 13 which are provided for each bolt and of which one is arranged on the outside on both flanges 3 and 5 and the other on the inside on both ring parts 8a and 8b. If a different expansion appears in the casing pipes, due to temperature variations, it can be equalized over the coupling point provided according to the invention. The parts 1 and 2 can move along the joint 4, since the two partial flange rings 8a, 8b must follow this displacement, due to the elastic sheath 12. The crowned pressure rings permit this displacement to the required extent without the sealing pressure being eliminated. Due to the fact that the elastic sheath 12 is connected gastight with the ring parts 8a, 8b, no additional measures are required for sealing, compared to the simple bolted joint as represented in FIG. 2.

Figure 4B:
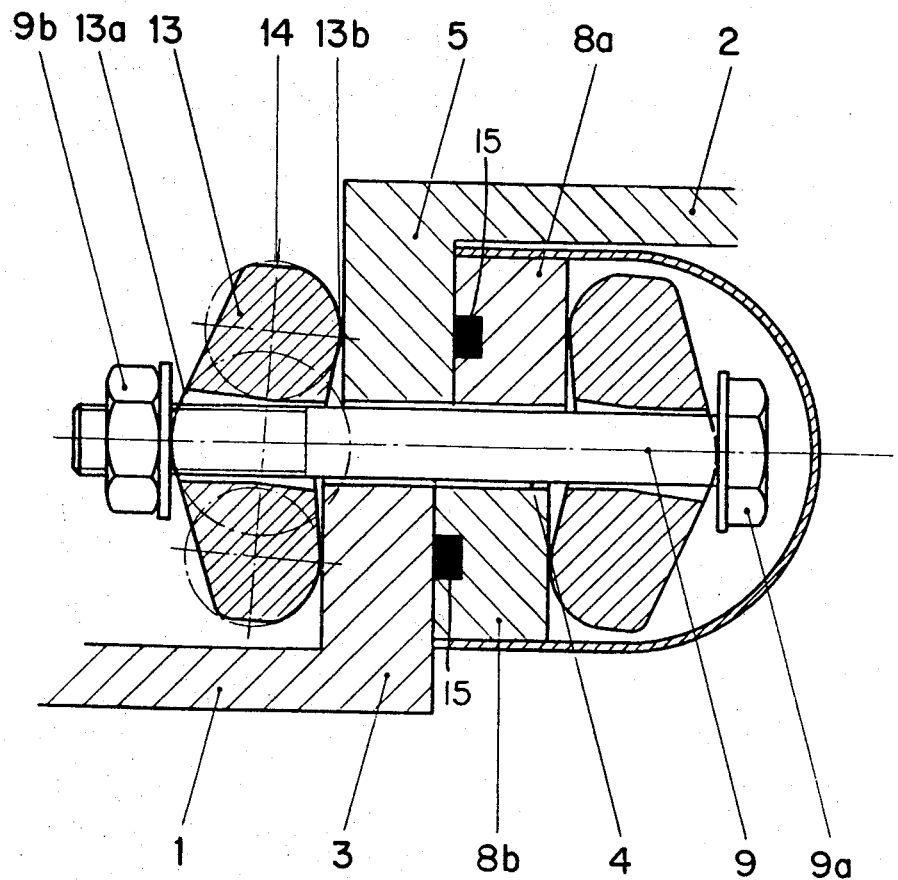
FIG. 4b shows the same arrangement as FIG. 4a in its action during the longitudinal equalization.

A particular difficulty in a bolted joint of the coupling according to the invention with the possibility for longitudinal equalization may be due to the fact, however, that the span of the bolts 9 can vary during the displacement of the casing sections and corresponding slanting of the pressure rings 13 (FIGS. 4a, 4b) so that the sealing pressure would also change. It is therefore important to design the pressure rings 13 so that a variation of the span of the bolts 9 is avoided by their slanting. This is achieved in a further development of the invention in that the pressure rings 13 are provided with circular pressure faces 13a, 13b transverse to the joint, whose centers lie on a line 14 and that the pressure rings so bear on the clamping bolt 9 that slanting of the pressure rings 13 can only taken place as a rotary movement about the center of the pressure surface 13a. Since the centers always lie on the perpendicular to the contact tangent (pressure-points), it is ensured that the span of the bolt 9 can not change and that the sealing pressure will thus be maintained in its total value as well as in its distribution. In all of the embodiments, sealing rings 15 of rubber or the like are seated in grooves at the interfaces between the connecting flanges 6, 6' and between the flanges 3, 5 and flange ring 8 and between the flanges 3', 5' and flange ring 8'.

I claim:

1. In a coupling structure effecting a gastight connection between the ends of two axially spaced tubular casing sections of a pressure-gas insulated switch plant, a removable tubular casing part extending between and interconnecting said tubular casing sections in axially spaced relation, said removable tubular casing part being constituted by two tubular portions provided with juxtaposed outwardly extending flanges on one end bolted together in a sealed joint and inwardly extending flanges on the other end which confront correspondingly located outwardly extending flanges on the ends of said axially spaced casing sections thereby to establish circular joints extending parallel with the axis of said casing sections across the end faces of said confronting inwardly and outwardly extending flanges, each of said circular joints being bridged over by a flange ring, and means bolting said flange rings into face-to-face sealing contact with said confronting inwardly and outwardly extending flanges.

2. A coupling structure as defined in claim 1 for axially spaced tubular sections of a pressure-gas insulated switch plant wherein said bolting means includes two series of circumferentially spaced bolts which extend respectively from said flange ring through said inwardly and outwardly extending flanges.

3. A coupling structure as defined in claim 1 for axially spaced tubular sections of a pressure-gas insulated switch plant wherein said bolting means includes a single series of circumferentially spaced bolts which extend from said flange ring through said circular joint and an exterior clamping ring having end flanges bearing respectively against said inwardly and outwardly extending flanges.

4. A coupling structure as defined in claim 3 for axially spaced tubular sections of a pressure-gas insulated switch plant wherein the end face of one of said inwardly and outwardly extending flanges is provided with a series of bores in which the bolts are received for passage through the circular joint.

5. A coupling structure as defined in claim 3 for axially spaced tubular sections of a pressure-gas insulated switch plant wherein the end faces of said inwardly and outwardly extending flanges are provided with a series of confronting half-bores in which the bolts are received for passage through the circular joint.

6. In a coupling structure effecting a gastight connection between the ends of two axially spaced tubular casing sections of a pressure-gas insulated switch plant, a removable tubular casing part extending between and interconnecting said tubular casing sections in axially spaced relation, said removable tubular casing part being constituted by two tubular portions provided with juxtaposed outwardly extending flanges on one end bolted together in a sealed joint and inwardly extending flanges on the other end which confront correspondingly located outwardly extending flanges on the ends of said axially spaced casing sections thereby to establish circular joints extending parallel with the axis of said casing sections across the end faces of said confronting inwardly and outwardly extending flanges, each of said circular joints having in association therewith first and second flange rings located in face-to-face sealing contact respectively with said confronting inwardly and outwardly extending flanges, a series of circumferentially spaced clamping bolts extending between said flange rings and through said circular joint, each said bolt including thereon at one end a first crowned pressure ring bearing against said flange rings and at the opposite end a second crowned pressure ring bearing against said confronting inwardly and outwardly extending flanges, and a ring-shaped elastic sheath secured to said flange rings and enclosing said bolts.

7. A coupling structure as defined in claim 6 for axially spaced tubular sections of a pressure-gas insulated switch plant wherein said crowned pressure rings are provided with circular pressure faces on one side in contact respectively with said flange rings and said confronting inwardly and outwardly extending flange rings, and a circular pressure face on the opposite side to which pressure is applied from the bolt, all of said circular pressure faces having their centers located along a common line.